United States Patent [19]

Brigante

[11] 4,406,794
[45] Sep. 27, 1983

[54] EXTERNAL SLUDGE COLLECTOR FOR BOILER BOTTOM BLOWDOWN AND AUTOMATIC BLOWDOWN CONTROL INITIATED BY CONDUCTIVITY PROBE WITHIN THE BOILER AND METHOD

[76] Inventor: Miguel F. Brigante, 16550 NW. 10th Ave., Miami, Fla. 33169

[21] Appl. No.: 297,258

[22] Filed: Aug. 28, 1981

Related U.S. Application Data

[63] Continuation-in-part of Ser. No. 153,219, May 27, 1980, Pat. No. 4,288,323.

[51] Int. Cl.³ .............................................. C02F 1/48
[52] U.S. Cl. .................................. 210/695; 122/382; 210/745; 210/95; 210/96.1; 210/222
[58] Field of Search ................................ 122/381–388; 210/695, 739, 745, 85, 95, 96.1, 104, 222, 223, 243

[56] References Cited

U.S. PATENT DOCUMENTS

| | | | |
|---|---|---|---|
| 1,831,075 | 11/1931 | Neeley | 210/223 X |
| 2,001,249 | 5/1935 | Greenlaw | 122/382 X |
| 3,512,507 | 5/1970 | Dixon | 122/382 |
| 3,552,189 | 1/1971 | Courvoisier et al. | 73/61.2 |
| 3,680,531 | 8/1972 | Holdt | 122/382 X |
| 3,697,420 | 10/1972 | Blaisdell et al. | 210/222 X |
| 3,714,037 | 1/1973 | Almasi et al. | 210/223 X |
| 3,908,605 | 9/1975 | Andersen | 122/382 |
| 4,012,278 | 3/1977 | Mostofin et al. | 159/30 |
| 4,148,731 | 4/1979 | Brigante | 210/695 X |
| 4,151,090 | 4/1979 | Brigante | 210/222 |
| 4,196,341 | 4/1980 | Williams | 122/382 X |

Primary Examiner—Robert H. Spitzer
Attorney, Agent, or Firm—Abraham A. Saffitz

[57] ABSTRACT

An improved electromagnetic boiler water conditioning apparatus and method for energy saving, comprising an electromagnetic water treatment unit combined with an external sludge collector attached to the boiler for boiler bottom blowdown by means of a solenoid valve controlled by a conductivity probe within the boiler. The probe is electrically connected to the solenoid blowdown valve. The blowdown is initiated by the conductivity probe whenever the dissolved solids within the boiler as a result of evaporation become too high. The external sludge collector permits unimpeded removal of sludge formed in the boiler passing into the collector and is a straight pipe having a diameter of about 2½ to 4 times, preferably 3 times, the diameter of the standard openings at the bottom of the boiler. The level of the water to the boiler is maintained by an automatic level control which can also be cleaned through the sludge collector. The invention contemplates inclusion of a turbidimeter at the end of the external sludge pipe to independently check suspended solids. The electromagnetic unit which is of unique value in the present combination for saving energy is that using seven propeller flights disclosed in my application Serial No. 153,219, filed May 17, 1980, now U.S. Patent No. 4,288,323

11 Claims, 6 Drawing Figures

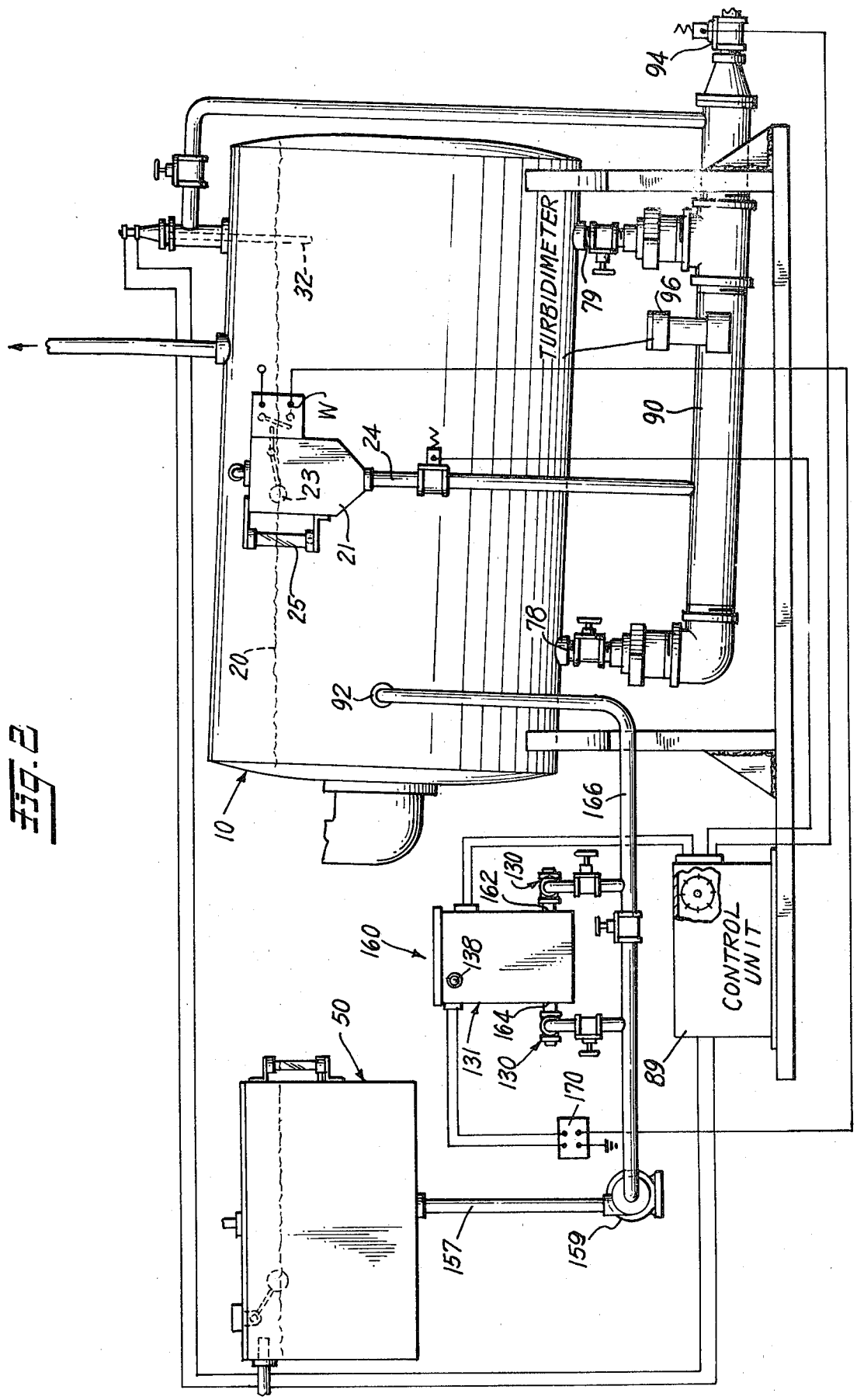

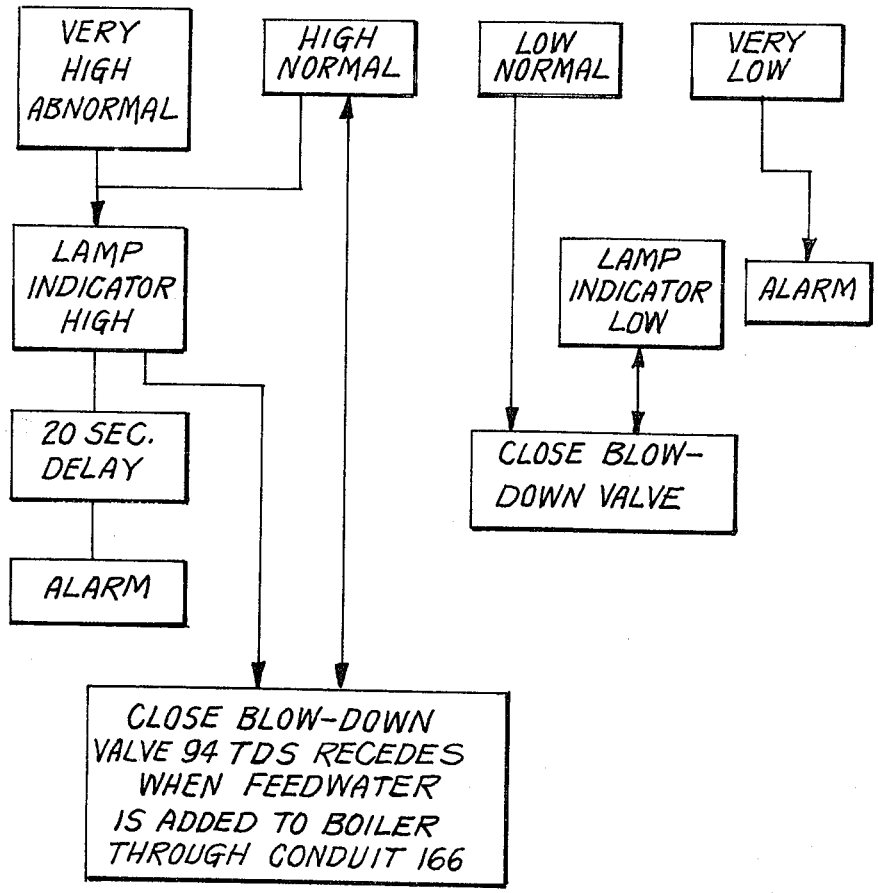
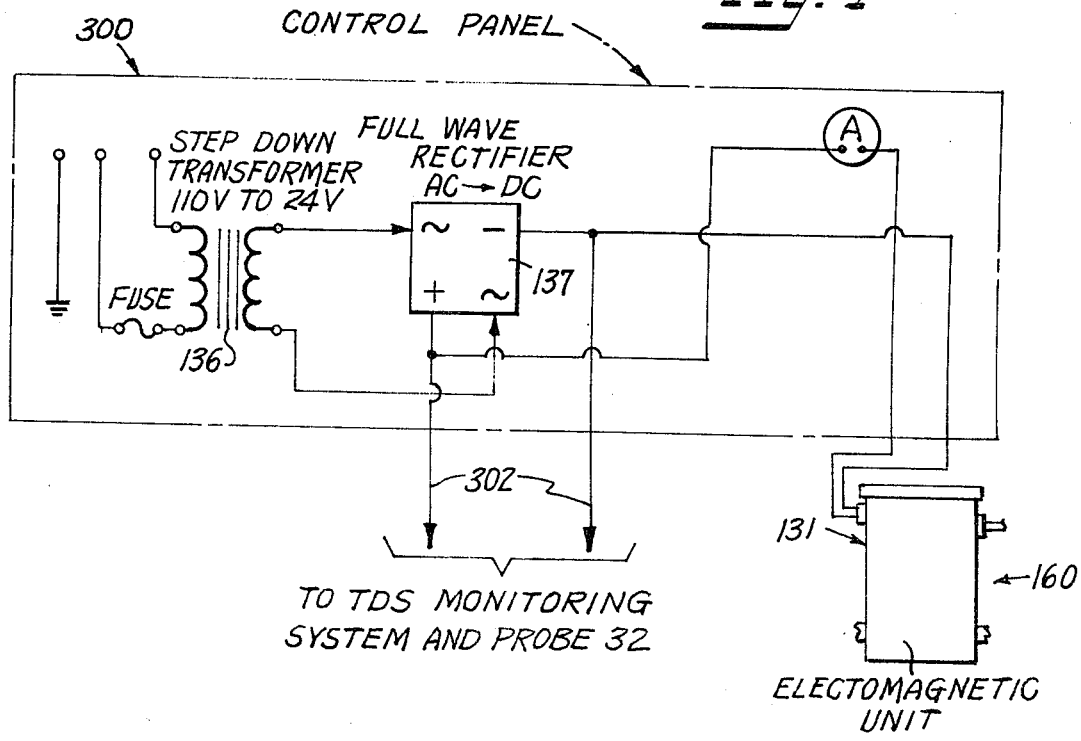

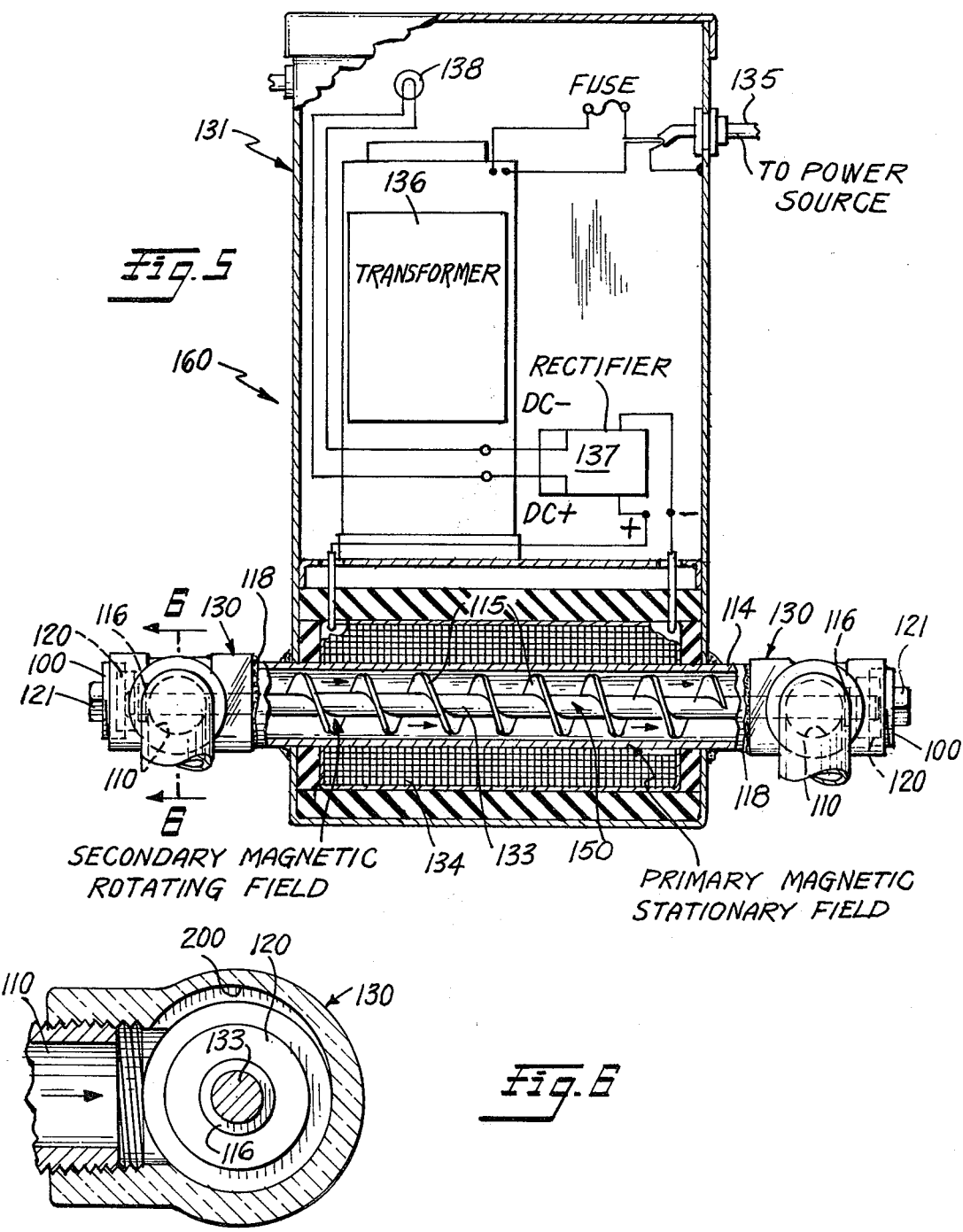

EXTERNAL SLUDGE COLLECTOR FOR BOILER BOTTOM BLOWDOWN AND AUTOMATIC BLOWDOWN CONTROL INITIATED BY CONDUCTIVITY PROBE WITHIN THE BOILER AND METHOD

CROSS REFERENCE TO RELATED APPLICATIONS

This application is a continuation-in-part of application Ser. No. 153,219, filed May 27, 1980, entitled Free Flow Corrosive Water Treatment Device, now U.S. Pat. No. 4,288,323.

BACKGROUND OF THE INVENTION

1. Field of the Invention

This invention is in the field of an electromagnetic water treatment device as disclosed in my U.S. Pat. No. 4,151,090 granted on Apr. 24, 1979, and my U.S. Pat. No. 4,148,731 granted on April 10, 1979.

This invention is in the field of liquid heaters, boilers and vaporizers which are provided with a cleaning means and in particular cleaning means in which pneumatic pressure for the purpose of separating suspended solids which collect at the bottom of the liquid heater or boiler.

This invention is in the field of testing the liquid suspension of solids and in improved electrical control circuits for such testing in order to initiate automatic blowdown of predetermined quantities of solids.

This invention also relates to low cost apparatus for the physical treatment of boiler water at elevated temperatures which includes as a critical step in such physical treatment the electromagnetic treatment of all incoming feed water to the boiler whereby suspended solids and dissolved solids in the water which is in an incipient state of precipitation can be safely removed physically by blowdown procedures in predetermined quantities and for predetermined times.

2. Description of the Prior Art

In the prior art of cleaning boilers by blowdown procedures water treating chemicals have been fed into the boiler and the treated water has been removed by blowdown devices, an example of said chemical treatment being Rivers U.S. Pat. No. 3,139,071. The chemical treatment in this patent requires the provision of a reservoir for the chemical, a pump, a filter, accurate records for the amounts employed and close supervision. Another example of a blowdown system employing chemicals to treat the water is found in Anderson U.S. Pat. No. 3,908,605. Anderson provides automatic operation and uses a conductivity sensor model which facilitates blowdown at low or at high pressures. Indeed, the Anderson system permits optional surface blow for removal of froth which accumulates in chemical treatment. One of the difficulties with the Anderson system is its high cost, despite the fact that the energy savings are significant. It is recognized that energy costs for fuel are very substantially affected by the scale thickness within the boiler. Tables and graphs provided by the EPA have demonstrated that 8% of the fuel bill is wasted, for a 100 horsepower boiler operating every day for the entire year at 85¢ per gallon, oil cost would add $18,466.00 to the bill. If the scale thickness increases to 7/64" then the extra oil cost is $46,165.00. Faced with these fuel costs it is not at all surprising to find that substantial investments are made in chemicals for water treatment within the boiler, for devices to dose these chemicals and for personnel to carefully watch this treatment.

The present invention provides an advantage over the Anderson system in his U.S. Pat. No. 3,908,605 by changing the location of the probe to within the boiler as is done in the nuclear energy steam plants and by providing a novel external straight line sludge collector having an enlarged diameter, two to four times the diameter of the standard opening at the base of the boiler whereby the sludge removed by outside blowdown avoids excessive turbulence within the boiler following automatic blowdown procedures, causing resuspension of the sludge resulting from inner blowdown.

Other prior art is known for automatic blowdown. For example, Holdt U.S. Pat. No. 3,680,531 in which a monitoring system is used for repeating the sampling at fifteen minute intervals in an automatic blowdown system. The present invention distinguishes over this Holdt patent in providing controls for the electromagnetic unit and for the sensor probe on a common panel so that there can be assurance that all physical treatment systems are operative. This not only improves the efficiency of the system but lowers the cost. Two panels are more costly than a single panel. Electrical costs are cut because the rectifier circuit for 24 volt DC current energizes the probe for sensing total dissolved solids and also energizes the electromagnet in the electromagnetic water conditioning unit.

Courvoisier et al U.S. Pat. No. 3,552,189 granted Jan. 5, 1971, assigned to the French Atomic Energy Commission discloses a monitoring apparatus to detect the imminent danger of scale formation on a surface for transfer of heat between scale forming liquid and the liquid in the form of vapor before deposit has begun to form. Courvoisier et al points out that large boilers used in the atomic energy field are very expensive and it is essential that they remain efficient in order to prevent irreparable damage to the boiler as well as costly chemical or mechanical cleaning of the surface after scale has formed. Although Courvoisier et al are familiar with boiler systems for the prevention of scale they recognize that for desalination of sea water by distillation that the formation of salt deposits is one of the most important problems to be overcome. As stated by Courvoisier et al, "the deposits which are formed increase at such a high rate that, when a drop in efficiency is observed as a result of such deposits, it is already too late to modify the conditions of operation of the plant (temperature, concentration factor, hydrodynamic parameters). It is therefore necessary to stop production in order to carry out either chemical or mechanical cleaning of the surfaces." The present invention is useful for the same purposes of Courvoisier et al but relies upon electromagnetic treatment to prevent scale deposits from adhering to the metal surface and utilizes in combination with the electromagnetic treatment, particularly in applicant's prior application Ser. No. 153,219 filed May 27, 1980, now U.S. Pat. No. 4,288,323, an external sludge collector in the form of a straight pipe with a diameter about three times as great as the diameter of the standard opening at the bottom of the boiler. As a direct result of the electromagnetic treatment, the deposited salt is formed as a nonadhering mass and can readily be removed by automatic bottom blowdown procedure from a location outside of the boiler.

I am also aware of the patent to Dallimonti, granted Jan. 4, 1977, assigned to Honeywell, Inc. of Minneapolis, Minnesota, which relates to a console cathode-ray digital display and control system which is especially adapted for large municipal water, sewage and steam systems. These industrial plants and particularly those which are used for automatic energy and boiling water reactors are benefited by digital display and control consoles on which are mounted a number of individual process control instruments and read-out devices arranged for manipulation and monitoring by a human operator to achieve control over the process. The apparatus of the present invention is adapted for monitoring within the system of this Dallimonti patent.

OBJECTS OF THE INVENTION

An object of the invention is to provide an improved apparatus for continuous operation of boilers embodying an external sludge collector in the form of a straight pipe connected to the two bottom openings, one at each end of the pipe of the boiler and further combined with an electromagnetic treatment unit as disclosed in my application Ser. No. 153,219, now U.S. Pat. No. 4,288,323.

A further object of the invention is to provide an improved low cost electromagnetic water boiler conditioning apparatus which saves energy wasted in blowing down under automatic sensing control the contents of the boiler to prevent the deposition of scale which system is adapted to be used without added chemicals for conditioning the water or with added chemicals and which controls the blowdown initiation by sensing the total dissolved solids during the boiler evaporation operation.

A further object of the invention is to provide an improved control system which is furnished with warning lights and an audible signal whenever the concentration of dissolved solids is too high to prevent the unintended boiling to dryness and deposition of scale.

A further object of the invention is to provide an improved bottom blowdown system which is operative to eliminate sludge collecting in a novel external sludge collector below the boiler, the sludge collector having precipitated particles conditioned to be in a nonadherent state by the action of the electromagnetic treatment of the module described in my application Ser. No. 153,219, now U.S. Pat. No. 4,288,323.

Further and other objects will be seen from the Summary, Detailed Description of the Preferred Embodiments and in the drawings herein.

SUMMARY OF THE INVENTION

This invention is directed to an improvement in electromagnetic water conditioning apparatus combined with an external sludge collector fitted to the bottom of a conventional boiler and further comprising a conductivity sensor within the boiler to provide an electrically operated sludge valve initiated boiler blowdown at this external sludge collector. The invention is based upon the discovery that the electromagnetic water conditioning treatment in the apparatus of my prior patent application Ser. No. 153,219, filed May 17, 1980, now U.S. Pat. No. 4,288,323, changes the feed water in the boiler in such a way that adherent precipitated solid particles are not formed inside the boiler tubes and in the walls of the boiler. The non-adherent precipitates which form during the normal boiler operation move by gravity and through normal currents which are operative within the hot liquid boiler so that the particles gather as sludge and pass out of the normal bottom openings in the conventional boiler.

The conventional boiler particularly those boilers less than 300 horsepower in rating are prone to break down and require frequent scaling treatment and chemical treatment because of the generally high hardness of the water. In most, if not all, of the states of the United States, there is a requirement in law that boilers meet standards of size and performance, these standards being the so-called ASTM standards which are uniformly followed in the fifty states. Not only do the standards specify the critical dimensions of the boiler and boiler openings, they also specify the ratings of the valves that are used. Thus, a standard boiler which is about five feet high and about twelve feet long has a shell of specified thickness, an iron alloy composition for the shell of specified composition and the inlet as well as the outlet openings at the top and bottom of the boiler are placed at specified locations and are of specified diameters. Further there is a uniform boiler and pressure vessel code of the ASME provided for the safe operation of boilers. This code places the requirements for boiler blowdown from the bottom of the boiler as well as from the top and other locations. For this five-by twelve boiler the opening at the bottom is an inch and one quarter and there are two such openings, one near the front and one near the back of the boiler.

The conventional blowdown operation for boilers which are subjected to bottom blowdown for the purpose of intermittent removal of solids in a small volume of water from the bottom while fresh makeup water is introduced through the water feed is that which is described in Dixon U.S. Pat. No. 3,512,507. The bottom opening for the blowdown in Dixon is connected to a pipe of the same diameter as the opening. An electrically operated valve is provided in a tap line which is connected to the makeup water in the tank so that the valve opens when a pump brings water into the boiler whereby the water tapped through the straight pipe equals the amount of water which comes in through the pump. Dixon's concept is to maintain a predetermined amount of solids in the water in the boiler and intermittently adding water from the makeup apparatus while tapping water in the same proportion in order to prevent the solids from building up in the tank.

The present invention differentiates from Dixon in adding an external sludge collector for the solids which tend as a result of the electromagnetic treatment only to collect in a non-adherent condition and to provide this sludge collecting pipe as a straight pipe between the two outlet openings in the bottom of the tank whereby the sludge collector traverses substantially the entire horizontal distance between the two openings and in parallel with the tank. A critical feature of the sludge collector is the diameter which varies from at least two and one-half times the diameter of the opening to about four times the diameter of the opening but is preferably three times the diameter of the opening.

A further feature of the invention is a novel dc control panel which economizes on the wiring for the dc probe which is used to sense the hot water conductivity based upon the use of a common control panel which is used to monitor the electromagnetic water treatment unit and specifically a magnetic winding for the electromagnetic water control unit.

Still another feature of the invention is the use of a turbidimeter which is mounted in the external sludge collector so that conditions of dirty water encountered when a high organic content in the feed water can be sensed by this meter.

It is within the contemplation of the invention to provide a common recorder to insure recording of the sensor probe which senses total dissolved solids and the turbidimeter. Such common records are known, for example, in the Mostofin, et al. U.S. Pat. No. 4,012,278, granted Mar. 15, 1977, entitled Feed Water and Condensate Sample Analyzer for Power Plants.

The invention is also directed to a new combination method for a straight line electromagnetic path through which all of the feed water to the boiler passes under a magnetic field varying between about 900 gauss and 1,200 gauss, preferably 1,150–1,200 gauss, the magnetic field being a constant dc field which surrounds a ferromagnetic tube and all of the water passing with turbulence through a passageway between a seven flight propeller and the inner wall of the ferromagnetic tube in a thickness of about 1/16 of an inch to about 1/64 of an inch, preferably 1/32 of an inch. The propeller with seven flights is also ferromagnetic and it causes at least about seven changes in direction of the water for each four inches of length or about 28 to 30 changes in direction per lineal foot. With this straight line flow there is combined a blowdown of the sludge in the boiler which departs from the conventional blowdown from the bottom of the boiler by introducing a separate straight line enlarged sludge collector constituting an external pipe with a diameter about three times the diameter of the opening at the bottom of the boiler. In numerical terms, this opening is generally about 1 inch in the standard 300 horsepower boiler and the external sludge collector has a diameter of at least 2½–4 inches, preferably 3 inches. The combination of the gravity flow within the boiler to the external sludge collector which follows the electromagnetic pretreatment in the 1/32 of an inch clearance between the propeller and tube achieves a precipitation of sludge in non-sticky form which collects continuously in the external sludge collector so that it can be removed by blowing.

Applicant has experimented with these boiler installations over a period of seven years and has for the first time discovered that it is possible to remove the sludge completely from the interior of the boilers if there are no curved or serpentine passageways which do not clog up and if the normal circulation within the boiler is aided by simple gravity to remove the sludge from the boiler to the external sludge collector. Without electromagnetic treatment the sludge is sticky and coalesces in large particles which then crystallize, harden and adhere to the metal. If mechanical removal of the sludge by blowdown is carried out and if the blowdown is initiated as soon as the solids content rises above a pre-determined value, the sludge still is sticky, crystallizes, hardens and forms scale. Only the electromagnetic treatment of all of the water with its dissolved solids and suspended organic matter appears to assure that the sludge can be passed by gravity from the interior of the tank to the external sludge collector from which it is removed by blowing.

BRIEF DESCRIPTION OF THE DRAWINGS

FIG. 2 is a diagrammatic side elevation view of the present invention using the external sludge collector to assist bottom blowdown triggered by the sensing probe in the preferred embodiment of the invention.

FIG. 3 is a schematic diagram of the electrically connected inductors for the bottom blowdown of the boiler.

FIG. 4 is a block diagram of the electrical connections of the control panel to the probe monitoring total dissolved solids in the boiler and of the electrical connections to the electromagnetic unit.

FIG. 5 is a diagrammatic side elevation, partly broken away, of the electromagnetic unit.

FIG. 6 is a view along section line 6—6 of FIG. 5.

DESCRIPTION OF THE PREFERRED EMBODIMENTS

Figure 1:
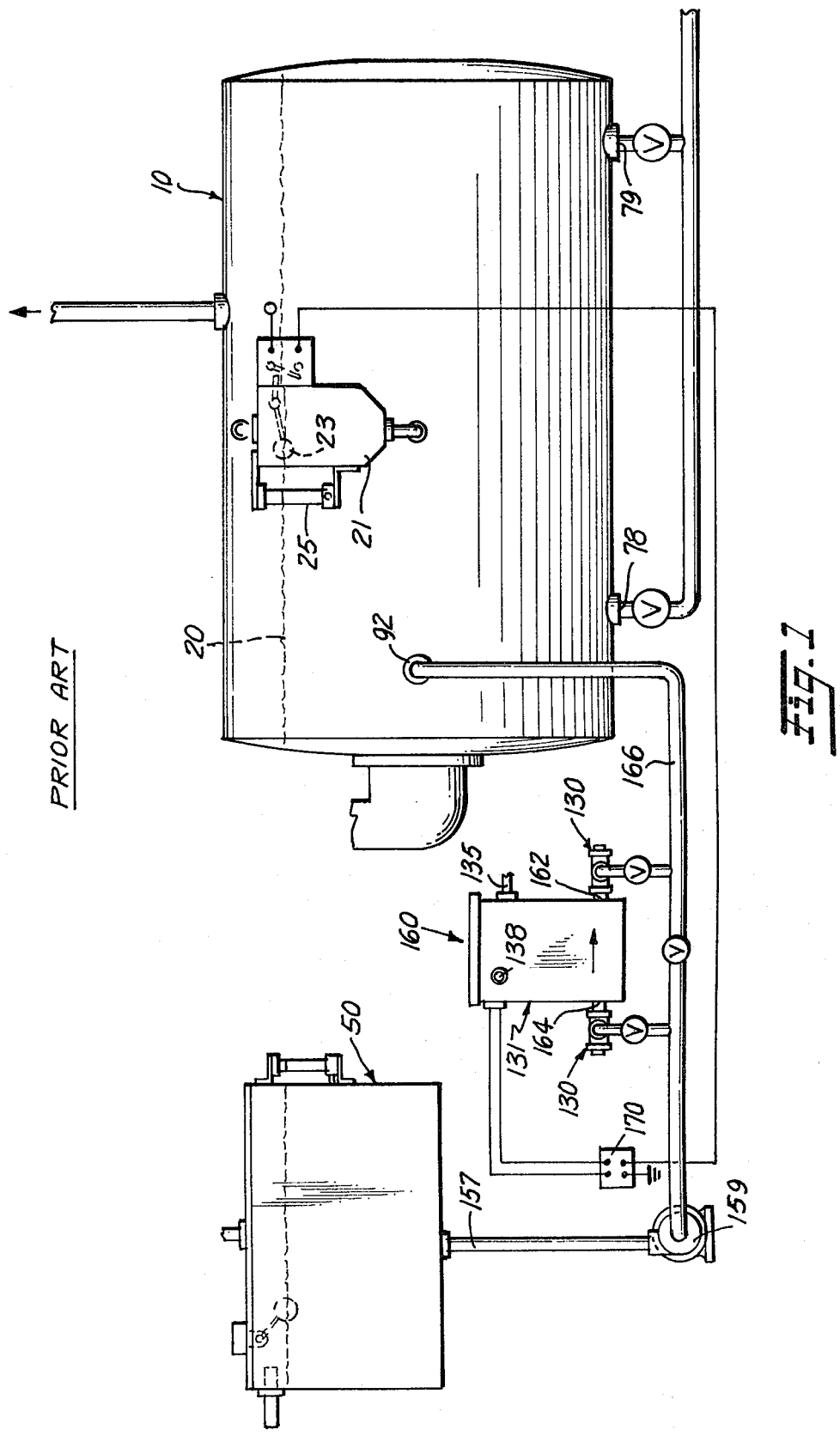
FIG. 1 is a diagrammatic side elevation view of prior art using the electromagnetic water treating unit of Application Ser. No. 153,219, now U.S. Pat. No. 4,288,323.

In FIG. 1 there is shown the prior art of the inventor's electromagnetic water treatment which has been used for the past two to three years in which a 7 flight propeller constitutes the secondary rotating magnetic field in the electromagnetic water conditioning unit of the type shown in U.S. Pat. No. 4,151,090 and shown in Ser. No. 153,219, filed May 27, 1980, now U.S. Pat. No. 4,288,323, in which this unit is connected to treat all of the incoming water from reservoir 50 into the conventional boiler 10. In a conventional combination of electromagnetic free-flow water treatment apparatus and boiler 10 of this prior art represented by FIG. 1 the level of the water in the boiler shown at 20 is controlled by the automatic level controller 21, which provides free head space above the liquid interface. All of the incoming water passes through the electromagnetic treating unit 160 from the reservoir 50. U.S. Pat. No. 3,512,507 to Dixon shows the connection a bottom blowdown device of the prior art to the blowdown opening 13 within a boiler 10 fitted with automatic level control and connected to a valve for the purpose of removing water from the boiler when the maximum solids content of the boiler water goes above a pre-determined value. In combining the electromagnetic treatment to all of the feed water to the boiler as in Dixon U.S. Pat. No. 3,512,507, the inventor has discovered that sludge is resuspended within the boiler and the resuspension prevents the desired efficiency of sludge removal from being achieved.

The main distinction between the prior art treatment of FIG. 1 which is based upon the inventor's own experience over the past two to three years, and the inventive embodiment of external sludge collector go connected to inlet 78 and outlet 79 as illustrated in FIG. 2 is directed to the problem of resuspension of the sludge within the boiler during blowdown operations.

Applicant has also employed bottom blowdown as described in patent to Anderson U.S. Pat. No. 3,908,605 and in the patent to Holdt U.S. Pat. No. 3,680,531, using end timed blowdown and as widely practised in the prior art. This has not been satisfactory.

Top blowdown has been unsatisfactory. It is only the combination of electromagnetic treatment and external blowdown outside of the boiler which has proven to be useful in eliminating resuspension of sludge in the boiler. The essential structure in FIG. 2 which overcomes the difficulty of the prior art is the enlarged diameter of the external blowdown pipe consisting of a straight pipe of diameter 2½ to 4 times the diameter of the connecting pipe from the boiler which uniquely permits the sludge to collect outside of the boiler under the negative angle of 0°–3° and at the same temperature of the water inside of the boiler. It is believed that the combination of streamlined flow from the rotation of the propeller under the intense field of 1150 gauss in the pipe about 1" diameter contributes in a new way to the separation of the sludge created in the boiler because of the flow through the conventional blowdown opening of about 1" as shown at opening 13 in Dixon U.S. Pat. No. 3,512,507 which corresponds to opening 78, in FIGS. 1 and 2. The return pipe 79 having the same 1" diameter and being at the far end of the enlarged straight pipe external sludge collector 90. The increase in diameter from 1" to at least 2½", or preferably 3" and up to 4" increase the volume of hot water in the enlarged external blowdown collector 90. If one were to use a conventional 1" pipe 14, as shown in FIG. 1, one would not be able to control the sludge buildup in the straightened line pipe section and there would be no margin of safety, nor any opportunity to view the collection of sludge by direct or indirect means. Indeed, it is an important feature of the present invention that a turbidimeter is shown in FIG. 2 but installed in bottom blowdown sludge collector pipe 90 in the lower end thereof adjacent the outlet which permits the turbidity to be checked independently of the rate of total dissolved solids e.g. the TDS rating which is provided by probe 32 within the boiler below the level of the liquid 20. The blowdown value 94 is electrically connected to the probe so that it is responsive to the TDS value which is sensed by the probe 32 for independent assurance of proper operation of incoming water from feed reservoir 50, of level flow recognition by flow regulator 21 and of TDS control, all being independently verified through the readings from the turbidimeter 96. This opportunity is of great advantage where dirty water is used for the boiler feed. Under these circumstances where the water is not only dirty but may be of extremely high hardness value, it is contemplated that chemicals can be added, in particular synthetic chemicals based upon derivatives of acrylic acid which will precipitate calcium and magnesium salts and therefore condition the feed water with the result that the precipitate collected within the external sludge collector 90 can be blown out by the operation of the probe 32, as well as by manual operation.

The operation of the prior art device as shown in FIG. 1 utilizes an automatic level controller which comprises a reservoir 50 for water from which the liquid passes through pipe 157 through pump 159 through the valving system in line 166 and then into the water intake for the automatic level system shown at water inlet 92. The operation of this automatic water feed has been a very assuring feature to prevent the boiler from going to dryness since the sight glass permits visual checking of the water level in reservoir 50 and the only requirement is that the reservoir 50 be maintained in liquid filled condition at all times. However, the collection of sediment, which occurs during the normal boiling operation, has constituted a major impediment to obtaining the major efficiency of the electromagnetic water treatment to all of the feed water in the boiler.

It is remarkable to discover that enhanced operation is achieved in the presence of chemical agents, as well as in the absence of these agents by virtue of the combined mechanical safety of external bottom blowdown coupled with electromagnetic water treatment. In this connection, one must take into account the characteristics of the feed water to the boiler, especially with respect to the suspended insoluble particles which tend to clog valve openings for the automatic level 21 and to this end there is provided an extension pipe 24 from the level controller 21 into the large diameter conduit 90 so that there is no buildup of debris at the ball float 23 of the constant level 21. A sight glass 25 is part of the level controller 21 to verify the operativeness of the level controller 21 and the control unit 89 is wired to operate both the level controller ball float 23, as well as the extension pipe 24 at location W as shown in FIG. 2. It is recommended where the water is dirty and holds suspended debris that the operation of the float valve be assured by draining the control into the sludge collector conduit 90 at least once a day and then refilling the controller to its desired level through the piping system through reservoir 50 through the electromagnetic unit 160 and into the inlet 92 into the boiler.

The electrical connections for the electromagnetic coils of the prior art unit 160 are shown at junction 170 and a pump 159 draws water through inlet pipe 157 from the reservoir 50 through the valves into the inlet 164 of the electromagnetic unit and out of the outlet 162 after treatment by the static field of about 1100 gauss and the secondary field within the electromagnetic treating unit.

Each of the T-shaped fittings 130 are assembled with the bearing assemblies 120 and these are axially secured by weldings 118 or other conventional suitable securing means, on opposite ends of the central conduit pipe 114. The T-shaped fittings 130, may be constructed of black iron pipe, galvanized iron, stainless steel or suitable plastic material, such as PVC, ABS, Delrin, ACETAL, or LEXAN. Each of the T-shaped fittings 130 includes internally threaded port means 110 to introduce the untreated feed water.

The T-shaped fitting 130 is formed with an internally threaded inlet 110 the other T-shaped fitting at the outlet is formed with an internally threaded outlet. Each of the T-shaped fittings 130 is formed with a volute 200 having its largest radius directed substantially radially and at a right angle with respect to the port openings 110, as viewed in FIG. 6. Feed water under pressure from the pump tends to fill the entire volume of the T-shaped fittings 130 and to flush out any air or other gases from all dead spaces which might otherwise be by-passed.

The above details of the inlet, outlet and the propeller are precisely those which are set forth in my co-pending application Ser. No. 153,219, filed May 27, 1980, now U.S. Pat. No. 4,288,323.

The relationship of the primary electromagnetic field to the secondary rotating electromagnetic field which is referred to hereinabove can best be clarified from FIG. 5 in which the relationship of the propeller to the diameter and length of the ferromagnetic pipe is illustrated.

The propeller 150 is ferromagnetic as shown in FIG. 5 and is integral with the propeller shaft and provides the secondary magnetic treatment by the rotation of its six to eight flights of ferromagnetic material extending the full length of the electromagnetic coil 134, so as to produce a high flux density and field intensity surrounding the blades of propeller 150. The shaft 133 is provided adjacent the ends thereof with stainless steel washers 116.

The six to eight flights 115 of the helical propeller provide an inner surface which resists flow in the direction of the arrow, e.g., city water and rotate at from 200 rpm to 800 rpm. The close spacing and rotation, even at lower water pressure, provide a sweeping action along the entire conduit pipe 114. The induced magnetic field effectively suspends particles which respond to the magnetic fields and to the rotational sweeping action.

The end portions of the propeller shaft 133 are supported by bearing bushings 120 at each end thereof which are constructed of materials to provide long life, friction-free, with infinitesimal whip or whirl.

The bearing bushings 120 are secured to externally threaded male pipe plugs 100. This may be accomplished by a press fit, cement or other conventional securing means. Each of the male pipe plugs 100 is provided with central projections 121 to facilitate installation or removal from the T-shaped fittings 130.

The adjustment and scale of the primary and secondary electromagnetic field can be better understood from the inventor's experience with different sizes of boilers. The conventional boiler as shown in FIGS. 1 and 2 is fitted with 1 inch of pipe at bottom outlets 78 and 79 and the same 1 inch diameter pipe is used in a 4 inch length for the smaller size commercial boiler. This 4 inch length may be increased by 20% as the diameter is scaled up to 4 inches for the very large boiler installations. The primary dc current of 24 volts which energizes the coil 134 of the permanent stationary electromagnetic field provides a current intensity of about 5 amperes on the average in the 1 inch diameter pipe size. As the diameter increases to 4 inches, the amperage can vary up to 18 amperes. This results in a stationary magnetic field of 1150 gauss.

The winding of the coil may be copper or aluminum, aluminum contributing to a lower weight for the unit. The wire may vary from No. 15 wire at 165 mils down to No. 6 wire at 345 mils.

The inventor has tested the installation of FIG. 1 designated as prior art to determine whether adjusting the current, the primary magnetic field and the secondary magnetic field can in any combination or variation improve the characteristics of the sludge which forms to facilitate its blowdown from the interior of the boiler using standard bottom blowdown equipment or top blowdown equipment. In this on-going study which the inventor has made during the past few years, the constant electromagnetic field of the coil was reduced by 25% and 50%, e.g., from 1150 to 600 and then to 750 gauss. The result was that the treatment was insufficient. Insufficient treatment resulted in poor separation. It was determined that a minimum of 900 gauss for the primary field was required. The flights of the propeller were changed from 2 to 8 and then to 16. Between 8 and 16 the additional flights were ineffective to add any improvement. Between 2 and 8 remarkable improvement was achieved which manifested itself in maintaining the propeller unit from all organic deposits for a period of about two years when 8 flights were used and only 6 weeks when two flights were used. The use of these 8 flights in a 4 inch length of pipe is intimately connected with the clearance of the propeller from the inside wall of the pipe, the clearance being critical between 1/16 of an inch and 1/64 of an inch. At a clearance of ⅛ of an inch the treatment is totally ineffective to condition the separated sludge in a form for easy removal. If the clearance is closer than 1/64 of an inch mechanical problems occur and the propeller wears away at its edge or on the inner wall of the pipe. It is clear that between 6 and 8 flights there is a change in direction within the pipe of 4 to 6 inch length which can vary from about 24 changes per lineal foot to 32 changes per lineal foot, preferably 28 changes per lineal foot. These changes are controlled along a helical path. These changes can be repeated by the axial vector which lies normal to the direction of flow. The secondary field which is generated by the movement of the propeller at between 200 rpm and 800 rpm provides a significant contributing effect which is believed to distinguish between all other electromagnetic field treatments.

For example, the patent to Almasi U.S. Pat. No. 3,714,037, utilizes a magnetic field of 900–1200 gauss at the center of a restricted passage which is very wide in relation to its height but there is no propeller movement to generate a secondary field and there is a special piping provision to separate particles which are magnetized and agglomerated. There are no other magnetic fields comparable to that which is used by applicant.

The present inventor is well aware of every use which has been made of the electromagnetic unit of this invention with a boiler and has kept a record of every sale, installation and the performance. This is the first instance described in this application in which this electromagnetic unit has been used in conjunction with a bottom boiler blowdown device outside of the boiler and in which the equipment comprises a sensing probe which will determine the total dissolved solids limit above which the electrical signal will actuate a solenoid valve to blow out a predetermined amount of liquid in a predetermined time from a straight horizontal pipe outside of the boiler while the liquid content is replenished. The device of the invention for accomplishing this bottom blowdown outside of the boiler is illustrated in FIG. 2.

The problem encountered in the prior art combination of FIG. 1 is that bottom blowdown in the boiler itself is not effective because of the lack of assurance that the boiler engineer will not permit the boiler to be heated to dryness. Top blowdown does not succeed because sludge collects at the bottom in any event. Combined top and bottom blowdown is wasteful and requires more effort than can be saved. It is only the device of the invention which carries out bottom blowdown outside of the boiler which solves the problem facing the prior art.

In FIG. 2 the sensing probe 32 is immersed a predetermined distance below the level 20 of the water in the boiler 10 and senses the total solids content at a location remote from the feed water inlet at location 92 adjacent the electromagnetic treatment end of the boiler 10. All of the feed water must pass through the electromagnetic treating unit which is shown in detail in FIG. 5 and comprises the single package 131 with the propeller 150 having the 6–8 flights of ferromagnetic material.

The conductivity probe 30 as shown in FIG. 2 is electrically connected to the control unit 89 which is a single control unit for the automatic blowdown of the sludge out of the external sludge collector 90 by means of the solenoid valve 94. The probe may be bought from Minneapolis Honeywell or Beckman Instrument Co. A preferred model is Beckman Model RAS7 Solu Meter Solution Conductivity.

The unitary package 131 is connected to the usual 110 volt ac line 135 (FIG. 5) step down transformer 136, a full wave rectifier 137 and dc leads to pilot light 138. The step down transformer 136 reduces the voltage to 24 volts and then connects to the electromagnetic coil 134.

An electrical tap 302 is provided to supply dc current to the sensing probe which is used for the TDS monitoring operation and is shown in FIG. 4. It is a feature of the invention that the same dc voltage feeds the sensing probe to detect total dissolved solids and is used to energize the permanent dc electromagnetic winding. The dc voltage is 24 volts and is shown in the circuit of FIG. 4 which is part of the control panel.

The schematic for the construction of the control panel 300 is shown in FIG. 4. The control panel comprises a step down transformer 136 from 110 volts to 24 volts and a full wave rectifier 137 of ac to dc to energize both the permanent magnet dc winding 134 of the electromagnetic core wrapping about the ferromagnetic tube 114 of the electromagnetic treating unit.

In the operation of the control panel 300 as shown in FIG. 4, the fuse marked with a legend in the primary of the step-down transformer 136 serves to guard against that unacceptable surges in line voltage so that for the continuous operation of the transformer 136 only the fuse need be checked. The ammeter in the line to the electromagnetic unit 160 is useful to gauge the field and to assure that the desired value of 1150 gauss is achieved. The tap from the full wave rectifier 137 to the TDS monitoring system assures that the probe 32 is energized and the block diagram of FIG. 3 is useful to monitor the operation of blowdown.

A very high abnormal reading of TDS, which is given by the probe 32, serves to light up the lamp indicator with the legend "HIGH" whereby, as shown by the arrow the blowdown valve 94 is closed, fresh feed water comes in and blowdown is effected whereby the TDS recedes.

A 20 second delay to permit these operations to occur is provided and if there is any fault or failure of the intended operation, the alarm for high abnormal is set off.

If the value of TDS sensed by the probe 32 is merely high normal, the alarm system is by-passed and the blowdown valve 94 is closed directly, while the feed water comes in and the TDS value recedes.

Where the setting of the probe 32 at the low end indicates a very low normal which could involve an overdose of chemical treatment and thereby the possibility of harming the operation by the introduction of unwanted chemical, the very low reading sounds the alarm as shown in the block diagram in FIG. 3. The low value could also be an indication that the probe 32 is not operating and hence a zero reading is given. In this case the alarm sounds. If this inoperative condition is caught on the way to zero, the "low" lamp indicator lights up, the blowdown valve is closed and blowdown occurs so that there will be no possibility of the boiler running dry due to the non-functioning of the probe.

In this warning system which is illustrated in FIG. 3 the time of blowdown is controlled by a commercial timer in known manner. The blowdown cycle may be 10 seconds every 2 hours, every 3 hours or every 4 hours depending upon the solids content of the feed water, the steam output of the boiler and the organic matter present in the feed water.

The safety and energy savings which are provided by the combination of electromagnetic water treatment of all of the boiler feed water with external blowdown in the enlarged external sludge connector below the boiler, enlarged from the standard L fitting in the boiler to a diameter 2½–4 times that of the standard L fitting is the result of a new cooperation between the electromagnetic water treatment and the blowdown from the straight line section of the external sludge collector.

The energy savings resulting from the blowdown in the separate sludge collector conduit can be better understood in view of the negative slope of 0° to 3° of the external sludge collector. For a 6 foot long section, the center line at the inlet 78 to the conduit 90 is ½ inch to 1 inch above the center line at the outlet 79 so that the sludge advances towards the outlet 79 under the force of gravity while permitting free circulation because of the enlargement of the diameter from the 1 inch at the bottom of the boiler the L shaped inlet to the 3 inches of diameter shown in the preferred embodiment.

Since the start of the water treatment in the first step is based on the water flow through a 1 inch diameter pipe 4 inches long in the electromagnetic treatment unit, it is seen that the 1 inch inflow an inlet 92 in the boiler is followed by a sludge path depending from a 1 inch pipe 78, without impediment into sludge collector 90 with its 3 inch diameter. The larger water mass in the sludge collector retains the heat to a temperature value much closer to that in the boiler while the solids move slightly by gravity towards the turbidimeter location 96 and the blowdown valve 94.

There is no impediment to sludge collection by gravity in conduit 90.

There is no impediment to collection at the lower end of conduit 90 and still there is no likelihood of plugging the valve because of the very slight drop. On the other hand, if the conduit slanted upwardly, there could be a plugging of the conduit 90 which takes place.

The short distance between the electromagnetic unit 160, inlet 92 and the entrance to conduit 90 assures that the magnetization which occurs if the liquid feed water conditions the precipitate so that it will not stick and be quickly removed by the blowdown valve 94. The rapid change in direction by the propeller flights (24 to 32 per lineal foot) in the electromagnetic unit and the 1/16" to 1/64" clearance for the water assures a high rate of flow, unimpeded by any turns, at a velocity of the propeller of 200–800 rpm.

The negative slope which aids the gentle gravity forces can be achieved if the boiler 10 is level and the connecting fitting to 79 is longer than the connecting fitting to 78. However, the tilted boiler is preferred.

The turbidimeter used is available from Hack Chemical Company and is described at page 129 of the Handbook of Advanced Wastewater Treatment by Culp, et al., published by Van Nostrand Reinhold Company, 1978.

It noteworthy to contrast the path of the water from Reservoir 50 in the prior art of FIG. 1 with the invention of FIG. 2, through the electromagnetic unit, into the boiler heated at the near end. The electromagnetic unit 160 as shown in FIG. 1 exhibits the same path as the water path in the preferred embodiment of FIG. 2. Also FIG. 2 utilized the same conventional reservoir 50 but adds the conductometric probe 32 at the far end of the heated boiler in electrical connection with the control unit 300 and also adds the external sludge collector 90, which removes sludge as soon as it is formed in the boiler. Finally a blowdown valve is attached to the exit of the external sludge collector. These added features cooperate in a new way to provide a result which cannot be achieved in the prior art.

In the prior art of FIG. 1, organic matter, suspended debris, and oily material tends to collect in the boiler as a result of evaporation of the heat. In the invention in FIG. 2 all of these materials are removed under natural circulation forces to the enlarged conduit 90, through the openings at the bottom of the boiler. It appears that the enlarged diameter of conduit 90 enhances this circulation which is not present in the narrow external horizontal pipe below the bottom of the boiler in FIG. 1. It appears further the large, hot liquid mass in conduit 90 in communication through the short connection promotes this circulation.

Having thus disclosed the invention what is claimed is:

1. A method of electromagnetic boiler feed water treatment combined with bottom blowdown of the sludge collecting at the bottom of the boiler comprising:

treating all of the feed water into the boiler with a constant primary dc magnetic field of about 900 gauss to 1200 gauss while rotatively propelling said feed water through a ferromagnetic tube by means of a magnetizable propeller having from 6-8 flights and spaced from the inner wall by 1/16 inch to 1/64 inch at 200 to 800 revolutions per minute thereby providing a rotating secondary field within said tube with from 24 to 32 changes in direction and to prevent suspended particles from coalescing to form scale from sludge;

sensing the dissolved solids content with a conductivity probe located in said boiler at a location remote from the entry location of the feed water into the boiler;

providing an external sludge collector connected to and in communication with the bottom openings of the boiler, said sludge collector having a diameter 2½ to 4 times the diameter of said bottom openings; and said sludge collector having a negative slope with respect to the boiler of from 0° to 3° to permit gravity flow of sludge therein and further having a blowdown valve at the lower end of said collector responsive to the total dissolved solids sensed by said conductivity probe whereby the solids separating from the boiler pass unimpeded into said sludge collector and then out by means of said blowdown valve.

2. A method as claimed in claim 1 wherein said sludge collector is fitted at the end adjacent said blowdown valve with a turbidimeter to measure the turbidity of the liquid near said blowdown valve.

3. Apparatus combining electromagnetic feed water treatment and bottom blowdown of sludge forming scale in a boiler comprising:

an electromagnetic treatment unit provided with a primary constant dc magnetic field of 900 to 1200 gauss by means of an electromagnetic coil surrounding a ferromagnetic tube through which all of the feed water passes by the rotation of a propeller having 6 to 8 flights and spaced from the inner wall of said tube by 1/16 inch to 1/64 inch while rotating at 200 to 800 revolutions per minute thereby providing a secondary magnetic field within such tube which prevents suspended sludge materials in the feed water from coelesing and forming scale in the boiler;

a conductivity probe in said boiler at a location remote from the entry of the electromagnetically treated feed water which measures total dissolved solids and is electrically connected to a blowdown valve to remove any sludge which forms;

said boiler having two bottom openings spaced from the ends thereof;

an external sludge collector in the form of a straight conduit having a uniform enlarged diameter 2½ to 4 times the diameter of said bottom opening and a negative slope of 0° to 3° with respect to said boiler;

connecting means which connects the near opening relative to the electromagnetic treatment unit to the inlet of said straight conduit of enlarged diameter and which connects the far opening to the exit end of said enlarged diameter conduit; and a blowdown valve connected at said exit end which responds to the conductivity sensing probe and which blows out the sludge from said enlarged conduit thereby removing it and avoiding the conversion of said sludge to scale within said boiler.

4. Apparatus as claimed in claim 3 including a turbidimeter in said enlarged diameter conduit.

5. Apparatus as claimed in claim 3 wherein said electromagnetic unit contains an electrical control panel and further comprises a transformer and rectifier to provide 24 volt d.c. which energizes the electromagnetic coil and also energizes said conductivity probe;

6. Apparatus as claimed in claim 5 wherein said control panel includes a warning light which lights when the total dissolved solids which are sensed by the conductivity probe is too high and an alarm which sounds.

7. Apparatus as claimed in claim 5 wherein said control panel includes a warning light when the total dissolved solids which is sensed by the conductivity probe is too low to indicate the possibility that the probe is not operating properly and a warning light is lit.

8. Apparatus as claimed in claim 5 wherein said electrical control panel includes an ammeter which measures the current energizing the electromagnetic coil.

9. Apparatus as claimed in claim 5 wherein a level controller is operatively connected to said boiler to maintain a constant liquid level therein at all times and thereby assure that the boiler is not heated to dryness.

10. Apparatus as claimed in claim 9 wherein said level controller induces a ball float, a chamber for the float, a sight glass and a return line connecting the chamber to said enlarged diameter conduit to permit blowdown cleaning of said ball float and assure proper operation of said level controller.

11. Apparatus as claimed in claim 5 wherein said ferromagnetic tube is fitted to the incoming water by means of a T fitting and said tube is fitted at its outlet to another T fitting, said T fitting housing bearing means for fitting propeller and being formed of transparent heat-resistant plastic.

* * * * *